United States Patent Office 2,695,945
Patented Nov. 30, 1954

2,695,945

REFRACTORY METAL ELECTRODE FOR INERT GAS-SHIELDED ARC WELDING

Louis A. Conant, Tonawanda, N. Y., assignor to Union Carbide and Carbon Corporation, a corporation of New York No Drawing. Application November 4, 1952, Serial No. 318,749

3 Claims. (Cl. 219—8)

This invention relates to arc welding of the type disclosed by Meredith 2,342,086 with a non-consumable electrode under a stream of inert gas including argon and/or helium, and more particularly to the composition of the electrode.

Although additives have been used in the past with consumable and non-consumable electrodes, sintered tungsten electrodes containing thoria or thorium oxide have only recently been used commercially for such welding. Electrodes containing 1% to 2% thorium oxide are generally preferred.

The advantages obtained by adding small amounts of thorium oxide to tungsten are (1) increased resistance to contamination by molten metal, (2) more stable arc operation at low welding current, (3) easier arc starting at relatively low voltage, (4) electrode operation at lower temperature, and (5) less work contamination by small particles of electrode. The major advantage is claimed to be an increase in electrode life by a factor of approximately 10, and is believed to result chiefly from the increased resistance to contamination by molten metal. A disadvantage may lie in the health hazard accompanying the presence of thorium or its oxide in the welding zone.

The main object of this invention is to provide a refractory metal electrode containing an additive that greatly improves the welding performance with respect to contamination losses, open circuit starting voltage, and arc starting losses even over thoria.

This is accomplished by the use of yttrium oxide as the additive. Yttrium earth concentrate has been found to be very satisfactory for the purpose.

The relative position of commercially available pure tungsten and 1% thoria-99% tungsten electrodes in laboratory tests is compared below with that of experimental electrodes of the invention containing yttrium oxide additives. The most desirable performance is indicated by the first tabulated column with performance deteriorating to the position tabulated in the third column.

|  | 1 | 2 | 3 |
|---|---|---|---|
| Contamination Losses | $Y_2O_3$ | $ThO_2$ | W |
| Open Circuit Starting Voltage | $Y_2O_3$ | $ThO_2$ | W |
| Arc Starting Losses | $Y_2O_3$ | $ThO_2$ | W |
| Operating Voltage | W | $ThO_2$ | $Y_2O_3$ |
| Melted Base Metal Area | W | $ThO_2$ | $Y_2O_3$ |
| Weld Nugget Shape | W | $ThO_2$ | $Y_2O_3$ |

In the following table, concentrations of additives are given with the understanding that the remaining material in the electrode is tungsten.

|  | Commercial | | Experimental, 2% $Y_2O_3$ |
|---|---|---|---|
|  | 100% W | 1% $ThO_2$ | |
| Density, gms./cm.³ | 18.9 | 18.9 | 15.7 |
| Contamination Losses, mg | 460 | 92 | 39 |
| Open Circuit Starting Voltage | >56 | 38 | 26 |
| Arc Starting Losses, mg | −5 | 0 | +1 |
| Operating Voltage | 8.5 | 8.2 | 7.4 |
| Melted Bead Area, 10⁻³ Sq. In. | 5.6 | 4.6 | 4.5 |
| Weld Nugget Top Width, In. | 0.12 | 0.11 | 0.12 |
| Weld Nugget Base Width, In. | 0.10 | 0.07 | 0.05 |

Materials used for fabricating experimental electrodes were tungsten powder (Sylvania) having a particle size of at least one micron, and yttrium earth concentrate (Fairmont). Such yttrium earth oxide concentrate contains chiefly yttrium oxide with some oxides of erbium and the earths of the yttrium, gadolinium, ytterbium and erbium groups.

Mixtures of tungsten and the appropriate chemical component, such as yttrium earth oxide concentrates, to yield the metal oxide are used to prepare ingots approximately ¾ x ¾ x 18 inches by conventional powder metallurgical techniques (pressing). These ingots are sintered at 2000° C. or above by passing an electric current through them. The ingots are then drawn or swaged to the final dimensions. Considerably more detail can be obtained from standard text books on the subject, such as "Tungsten" by Smithells, or "Tungsten" by Li and Wang.

The standard Linde "Heliarc" welding equipment on hand was not suitable for handling the experimental electrodes. For this reason a special water-cooled torch was constructed. The torch provided a tapered collet ground to pass the shielding gas and partially slotted lengthwise to grip the electrodes. The exposed length of electrode extended approximately one inch below the contact point. A washer soldered to the end of the collet improved electrode protection by controlling the shielding gas flow pattern. Pyrex tubing of 9/16 inch inside diameter was cemented into an annular groove of the copper base to form a transparent gas cup to facilitate visual observation of the electrode tip during operation.

The starting voltage characterizing an electrode under given starting conditions is an important quantity as it is a measure of the open circuit requirement on the welding generator. Electrodes which require a relatively low open circuit voltage for starting result in a stable arc almost instantaneously, thus minimizing labor and material expenses particularly in machine welding. Comparison was made with commercially pure tungsten and thoriated tungsten electrodes. At the time of these tests only 3/32 inch diameter commercial thoriated tungsten electrodes were on hand. These were mounted in a standard torch. A 3/32 inch diameter commercial tungsten rod was similarly tested.

Exploratory tests disclosed experimental conditions which not only indicated starting voltage differences, but also permitted results to be obtained with satisfactory reproducibility. The test conditions were (1) a hemispherical electrode tip, (2) a cold arc length of 0.050 inch, (3) an established arc of 80 amperes, DCSP, (4) an argon flow rate of 15 cfh, and a fairly massive stainless steel anode or workpiece. A motor-generator was used as the welding power source; external field excitation was used to extend the open circuit voltage range below 40 volts. Gap breakdown was initiated by the output from a high-frequency stabilizer. The starting voltage under these conditions was taken to be the minimum open-circuit voltage for which reliable and instantaneous starting resulted in at least nine of ten consecutive trials.

The experimental electrodes were subjected to starting loss tests during the course of which the tip condition was altered as a result of repeated arcing.

*Starting voltages*

| Electrode | Open Circuit Voltage | |
|---|---|---|
|  | Before Loss Tests | After Loss Tests |
| 100% W (Commercial) | >56 | 56 |
| 1% $ThO_2$−W (Commercial) | 38 | 28 |
| 2% $Y_2O_3$−W | 26 | 28 |

Electrode weight loss during starting with high-frequency voltage is significant in connection with spot welding and with repetitive machine welding of small parts or short lengths of seam. Starting loss characteristics were established by determining the weight change produced by 100 successive arc strikings. Equipment was constructed in which motor-driven cams actuated switches permitting automatic execution of a 16.5 second operation cycle as follows: (1) line power was supplied to a Westinghouse Rectarc welder having an open-circuit voltage of 70 volts, (2) line power was supplied to a Westinghouse high-frequency stablizer for about 0.5 second, the output breaking down the arc gap and establishing a 110 ampere DCSP argon-shielded arc, and (3) following operation of the arc for approximately 1.5 seconds, power to the welder was interrupted. A short "arcing" time was selected to reduce contributions to weight changes from "arcing" alone and a cycle period large with respect to the time of arcing was used to provide a reasonable interval for cooling the work metal to avoid puddle build-up problems. Following original adjustment of the arc length to 0.050 inch, no further manual adjustment in arc length was made throughout the test. A stainless steel anode was utilized with an arc current of 110 amperes DCSP. The argon flow rate was 20 C. F. H.

*Starting losses for experimental and commercial electrodes*

| Electrode | Wt. Change after 100 Starts | | |
|---|---|---|---|
| | Trial I | Trial II | Avg. |
| | Mg. | Mg. | Mg. |
| ¾₂″ W (Commercial) | −12.9 | −15.9 | −14.4 |
| ¾₂″ 1% ThO₂−W (Commercial) | 0 | +0.1 | 0 |
| 2% Y₂O₃−W | −0.5 | +1.5 | +1.0 |

However, it is apparent that the new electrodes are better than commercial tungsten electrodes with respect to starting losses. Investigators have reported on studies of argon-shielded arcs between electrodes in which metal transfer from anode to cathode was observed. This phenomena might account for the weight increases observed. If this behavior took place, the Y₂O₃ electrodes should have been coated lightly with stainless steel. Although qualitative chemical or spectroscopic examinations of the tip were not made, further tests did not show any obvious effects which might be attributed to the presence of stainless steel.

The operating voltage is of interest because it is a measure of power input to the arc. Since most welding comparisons are made on an equal current basis and since in inert gas-shielded refractory electrode arc welding the ratio of power transfer to the work to power input is nearly constant for a wide variety of conditions, the arc voltage is essentially a direct measure of the energy transferred to the work. Accordingly, for many applications a high arc voltage is desirable. On the other hand in welding thin materials burn-through and other undesirable heating effects are to be avoided. One method of doing this is to decrease the arc power by decreasing the arc voltage. The table below shows that the electrodes of the invention produce appreciable lowering of the arc voltage.

Another method of reducing arc power is by reducing the arc current. The extent to which this can be done is determined by the lower current limit for stable operation. This in turn is a function of electrode composition. It has been shown that stable operation can be realized at lower current than that found for standard tungsten rods by using thoriated electrodes. Such a determination has not been made for the experimental electrodes which have been studied. However, since it is believed that the starting voltage requirement is an indication of the lower current limit for stable operation, those experimental electrodes having low starting voltage requirement are expected to operate stably at low arc currents. These are the same electrodes that produce appreciable lowering of the arc voltage so that yttrium oxide may be doubly advantageous when used as electrode additive for welding thin materials.

All of the experimental electrodes containing additives operated at the normal pure tungsten electrode voltage or less. The measurements were taken with a 150 ampere DCSP argon-shielded arc on stainless steel. The argon flow rate was 20 C. F. H. At least five readings were obtained at each length setting, the averages being shown in the data table. These data include the IR drop along the electrode.

*Operating voltages*

| Electrode | Arc Voltage at— | |
|---|---|---|
| | 0.04″ Length | 0.16″ Length |
| W (Commercial) | 8.4 | 10.7 |
| 2% Y₂O₃−W | 7.4 | 9.7 |

Weld beads were made to compare the influence of electrode composition on penetration and the amount of work metal melted. These welds were made at a welding speed of 40 I. P. M. on 0.055 inch thick stainless steel (Type 304) with 150 ampere DCSP arcs. The cold arc length was 0.050 inch and the argon flow rate 20 C. F. H. The data presented below were obtained from single cross-sections. The dependence of melted area on arc voltage is shown by these data. The last column has been calculated to give a rough metal-melting-efficiency comparison.

*Electrode influence on bead shape*

| Electrode | Average Arc Voltage | | Bead | | | Melted Area, Arc Voltage (Sq. In./Volt) |
|---|---|---|---|---|---|---|
| | Observed | Calculated | Top Width (In.) | Bottom Width (In.) | Area Method Metal (Sq. In.) | |
| W | 8.8 | 8.5 | .118 | .098 | .0056 | 6.4 |
| 2% Y₂O₃−W | 7.5 | 7.5 | .124 | .054 | .0045 | 6.0 |

Losses of electrode by lower melting alloy formation following accidental contact with molten metal are likely to be one of the most important factors in determining electrode life, particularly in hand welding applications. For this reason, measurements were made to determine the ability of various electrodes to withstand contamination by molten stainless steel. A 200 ampere arc was maintained on a stainless steel anode for two minutes; the electrode was then forced into the molten pool of the anode four times in succession (the arc re-establishing itself between immersions) and finally operated for another two-minute period to allow impurities in the electrode to "burn-off." During the entire process the argon flow rate was 25 C. F. H.

*Contamination losses for welding electrodes*

| Electrode Material | Measured Loss (Mg.) |
|---|---|
| W (Commercial) | 460 |
| 1% ThO₂−W (Mallory) | 92 |
| 1% ThO₂−W (GE) | 77 |
| 2% Y₂O₃−W | 39 |

While tungsten containing 2% Y₂O₃ has proved to be satisfactory as the material for the electrodes of the invention, it will be understood that any suitable percentage of Y₂O₃ may be used, such as 1%–6%, for example. Also, the additive may be incorporated with the refractory metal in the usual way that any additive is added in the course of manufacture of the electrodes. In such case care should be taken to add enough excess of the desired final percentage of the additive to take care of any loss that might occur in subsequent stages such as heating, swaging, drawing, etc. The invention is suitable for cutting as well as welding by the inert gas-shielded process.

I claim:

1. A gas-shielded arc welding electrode composed of refractory metal such as tungsten having mixed therein about 2% of finely-divided yttrium oxide.

2. An electrode for inert gas-shielded metal arc fusion processes comprising tungsten having an additive of the order of 1% of yttrium oxide.

3. A gas-shielded arc welding and cutting electrode comprising 1%–6% of yttrium earth concentrate, the balance being tungsten.

References Cited in the file of this patent

UNITED STATES PATENTS

| Number | Name | Date |
|---|---|---|
| 1,569,095 | Laise | Jan. 12, 1926 |
| 1,843,244 | Rukop | Feb. 2, 1932 |
| 2,515,559 | Lancaster et al. | July 18, 1950 |